Inventor
Herbert L. Towns
by Mawhinney & Mawhinney
Attorneys.

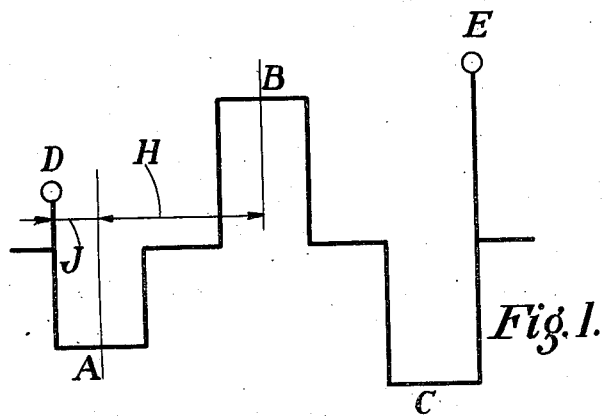
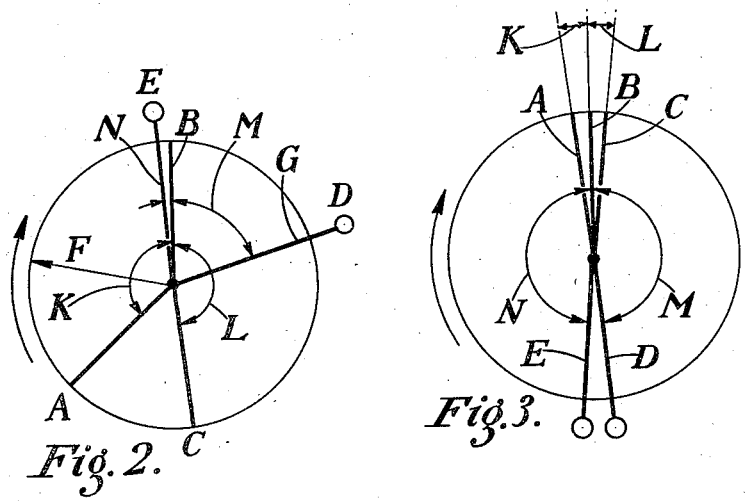
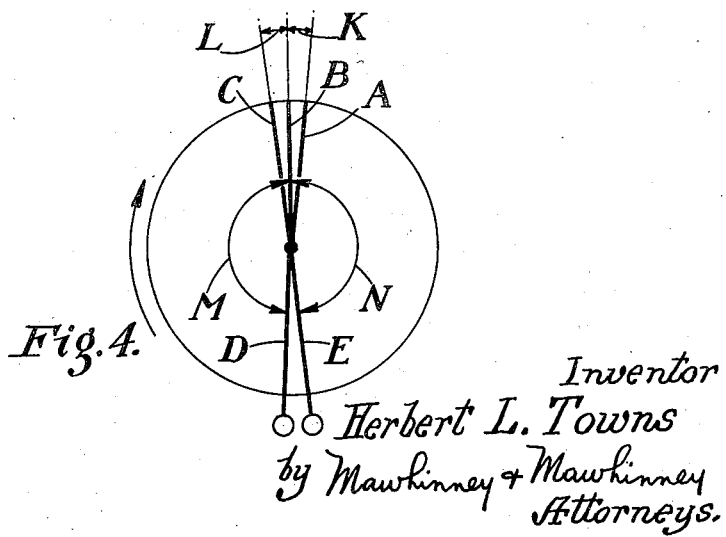
Fig.1. Fig.2. Fig.3. Fig.4.
Inventor
Herbert L. Towns
by Mawhinney & Mawhinney
Attorneys.

Patented June 7, 1938

2,120,045

UNITED STATES PATENT OFFICE 2,120,045

AIR-COOLED INTERNAL COMBUSTION ENGINE

Herbert Langley Towns, Coventry, England, assignor to Armstrong Siddeley Motors Limited, Coventry, England Application September 21, 1937, Serial No. 164,992
In Great Britain August 9, 1937

3 Claims. (Cl. 123—55)

This invention relates to air-cooled internal combustion engines, particularly for use in aircraft, of the kind having X rows of cylinders arranged radially in a circle and spaced angularly from one another, each row comprising Y cylinders, where X and Y are both greater than two, and a cylinder of each row being associated with one of the throws of a crankshaft having as many throws as there are cylinders in a row, i. e., having Y throws.

In the case of many such engines it is possible to arrange for equal firing intervals for all the cylinders when the cylinders of each row are in a longitudinal plane and the crankshaft is a symmetrical one—i. e., in the case of a 3-throw crankshaft, the throws are angularly spaced from one another 120°. This is so, for example, in the case of an engine having five rows of three cylinders. In the case of an engine having a number of cylinders which is not exactly divisible into 360, and where the number (X) of rows is exactly divisible into the number (Y) of cylinders in a row, or where the number (Y) of cylinders in a row is exactly divisible into the number (X) of rows (for example, an engine having nine rows of three cylinders), when using a crankshaft with equally-spaced throws the usual practice would be to arrange for the cylinders associated with one throw to be staggered with respect to those associated with another throw.

Now, according to the present invention, the cylinders of each row are arranged in a longitudinal plane and the crankshaft is not a symmetrical one but the throws are angularly spaced irregularly with respect to one another so as to provide for equal intervals of firing of all the cylinders. In this way it is possible to build a large compact air-cooled engine in a very satisfactory manner.

The invention is particularly applicable to an engine where Y, the number of cylinders in a row, is three or some other odd number, and in this event the angular spacing of one throw from another is $$\frac{360°}{XY}$$

provided that the value is not $$\frac{360°}{X}$$

or a multiple thereof.

The arrangement is preferably such, where Y is three, that the front and rear throws are angularly spaced equally from the centre throw.

In the accompanying drawings:—

Figure 1 is a diagrammatic elevation of one three-throw crankshaft for a 27-cylinder engine, having nine rows of three cylinders, arranged according to the invention;

Figure 2 is a diagrammatic end view showing the angular spacings of the three throws and of front and rear balance weights for one system of balance weights;

Figures 3 and 4 are diagrams corresponding to Figure 2 but for cases where the front and rear throws are symmetrical with respect to the centre throw;

Figure 6:
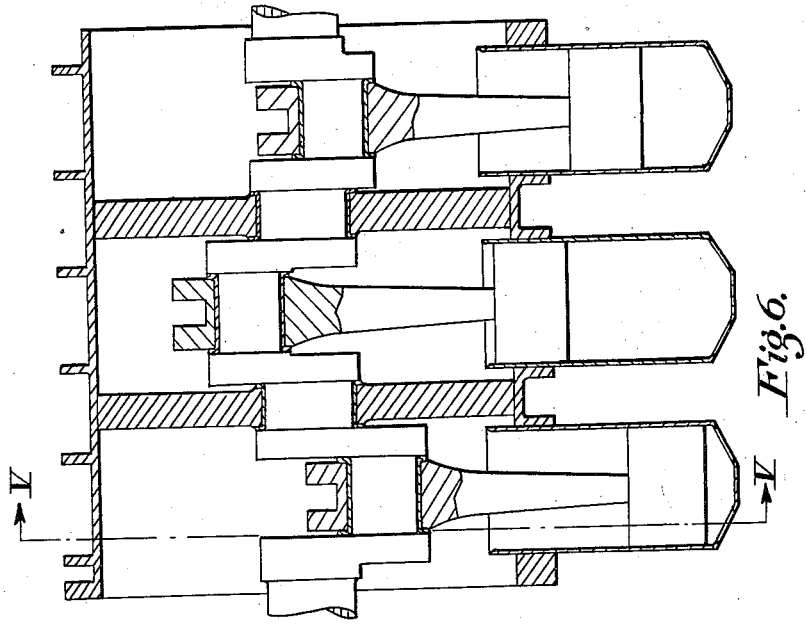
Figure 6 is a longitudinal section through the three master connecting rods taken mainly on the line VI—VI of Figure 5.
Figure 5:
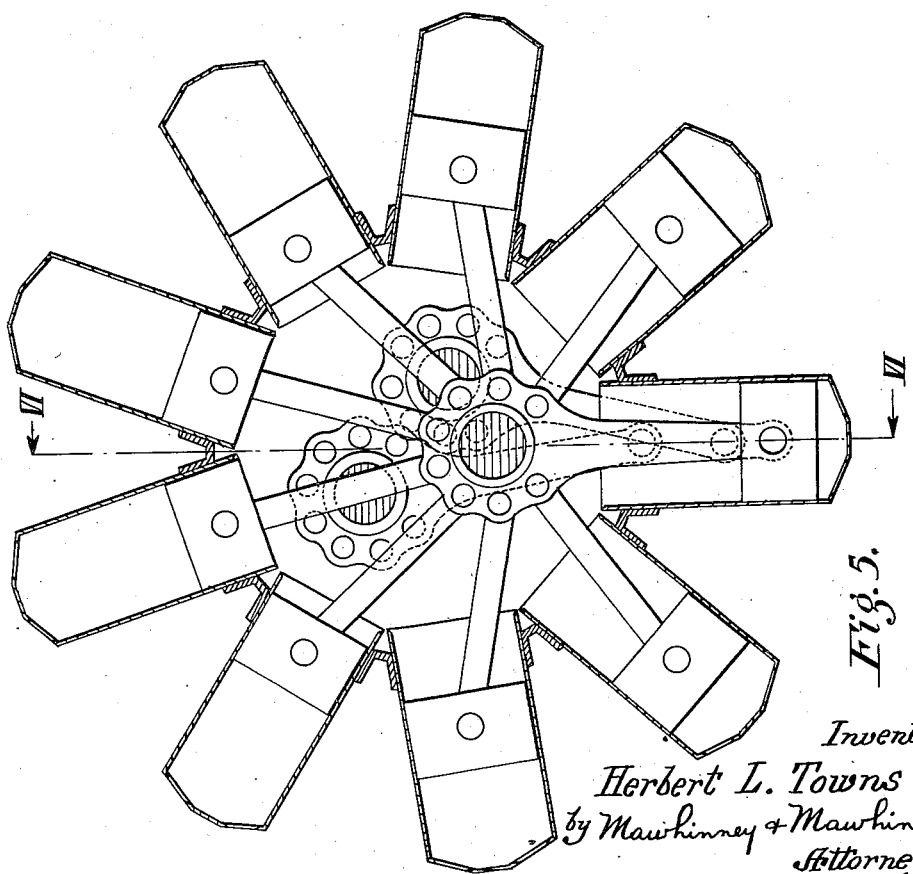
Figure 5 is a cross sectional axial view of the engine taken mainly on the line V—V of Figure 6 and showing by dotted lines the two master connecting rods associated with the other two crank-throws.

In all the figures, the arrow represents the direction of crankshaft rotation. In Figure 3 the front throw is shown to the left of the centre throw, and in Figure 4 to the right thereof.

In all the figures, A represents the front throw, B the centre throw and C the rear throw. D represents and is numerically proportional to a single front balance weight and E a single rear balance weight. F is the radius of the throws, G the radius of the centre of mass of the balance weights. H is the axial distance between the centres of two adjacent throws, J the axial distance between the centre of mass of either balance weight and the centre of the adjacent throw. K is the angle between the front throw and the centre throw, L the angle between the rear throw and the centre throw, M the angle between the centre of mass of the front balance weight and the centre throw, and N the angle between the centre of mass of the rear balance weight and the centre throw.

The angles K and L are $$\frac{360°}{XY}$$

(i. e., 13° 20', when X, the number of rows of cylinders, is 9 and Y, the number of cylinders in a row, is 3) or a multiple thereof but such multiple shall not be $$X \cdot \frac{360°}{XY}$$

i. e., not 120°, nor can it be $$Y \cdot \frac{360°}{XY}$$

i. e., $$\frac{360°}{X}$$

or a multiple thereof.

If the firing order is known then the angles K and L are known. For example (denoting the cylinders in one row by the reference 1, those in the next row by the reference 2, and so on, the cylinders in the last row being denoted by the reference 9), if the firing order is 1A, 5B, 1C, 3A, 7B, 3C, 5A, 9B, 5C, 7A, 2B, 7C, etc., then the angle K is 133° 20′ (ten times 13° 20′) and the angle L is 173° 20′ (thirteen times 13° 20′). The actual masses of the balance weights and the angles M and N can then be calculated from the following four formulae:—

(1) $E \cos N + D \cos M = \cos(180-K) + \cos(180-L) - 1$ (2) $D \sin M - E \sin N = \sin(180-K) - \sin(180-L)$ (3) $D \cos M - E \cos N = \dfrac{H}{J+H} \{\cos(180-K) - \cos(180-L)\}$ (4) $E \sin N + D \sin M = \dfrac{H}{J+H} \{\sin(180-K) + \sin(180-L)\}$ Assuming that
$$\frac{H}{J+H} = 0.819$$
the solution of these equations is
$$M = 71° 48′$$
$$N = 4° 54′$$
$$D = 0.685$$
$$E = 0.467$$

The front balance mass is actually
$$D \cdot \frac{F}{G}$$
multiplied by the crank pin mass and the rear balance mass
$$E \cdot \frac{F}{G}$$
multiplied by the crank pin mass.

For other firing orders other values will be chosen for the angles K and L.

In carrying out the invention, however, it is preferable that the front and rear throws should be equally spaced from the centre throw, i. e., that the angles K and L should be equal. In this case angle M equals angle N, and D equals E.

In the following table I give a complete range of values for the systems shown by Figures 3 and 4, assuming that the value of
$$\frac{H}{J+H} = 0.819$$

| K=L | M=N | D=E | Fig. | Firing order |
|---|---|---|---|---|
| 13° 20′ | 172° 42′ | 1·482 | 3 | 1A, 2B, 3C, 3A, 4B, 5C, etc. |
|  |  |  | 4 | 1A, 1C, 2B, 3A, 3C, 4B, etc. |
| 2 (13° 20′)=26° 40′ | 165° 12′ | 1·44 | 3 | 1A, 3C, 3B, 3A, 5C, 5B, etc. |
|  |  |  | 4 | 1A, 1B, 1C, 3A, 3B, 3C, etc. |
| 4 (13° 20′)=53° 20′ | 149° | 1·275 | 3 | 1A, 3B, 5C, 3A, 5B, 7C, etc. |
|  |  |  | 4 | 1A, 8C, 1B, 3A, 1C, 3B, etc. |
| 5 (13° 20′)=66° 40′ | 139° 58′ | 1·17 | 3 | 1A, 5C, 4B, 3A, 7C, 6B, etc. |
|  |  |  | 4 | 1A, 9B, 8C, 3A, 2B, 1C, etc. |
| 7 (13° 20′)=93° 20′ | 118° 24′ | ·93 | 3 | 1A, 4B, 7C, 3A, 6B, 9C, etc. |
|  |  |  | 4 | 1A, 6C, 9B, 3A, 8C, 2B, etc. |
| 8 (13° 20′)=106° 40′ | 105° 12′ | ·813 | 3 | 1A, 7C, 5B, 3A, 9C, 7B, etc. |
|  |  |  | 4 | 1A, 8B, 6C, 3A, 1B, 8C, etc. |
| 10 (13° 20′)=133° 20′ | 72° 38′ | ·624 | 3 | 1A, 5B, 9C, 3A, 7B, 2C, etc. |
|  |  |  | 4 | 1A, 4C, 8B, 3A, 6C, 1B, etc. |
| 11 (13° 20′)=146° 40′ | 53° 20′ | ·56 | 3 | 1A, 9C, 6B, 3A, 2C, 8B, etc. |
|  |  |  | 4 | 1A, 7B, 4C, 3A, 9B, 6C, etc. |
| 13 (13° 20′)=173° 20′ | 10° 54′ | ·502 | 3 | 1A, 6B, 2C, 3A, 8B, 4C, etc. |
|  |  |  | 4 | 1A, 2C, 7B, 3A, 4C, 9B, etc. |

It will be obvious that more than two balance masses can be used if desired. It should also be noted that K=L is never equal to
$$\frac{360}{Y}$$
(i. e., 120°) or to
$$\frac{360}{X}$$
or a multiple thereof—i. e., even firing cannot be obtained for values of
$$K=L \text{ or } 3(13° 20′)$$
which equals
$$Y \cdot \frac{360°}{XY}$$
or 6 (13° 20′), which equals
$$2 \cdot \frac{360°}{X}$$
and so on.

Whilst the invention has been particularly described with reference to a 27-cylinder engine having nine rows of three each, it is believed that, from the examples given, no difficulty will be experienced by those skilled in the art in applying the invention to a four or other throw crankshaft. Moreover, the invention may be applied to an engine (for example, to a 15-cylinder engine having five rows of three each) for which the normal practice of providing equal intervals of firing of all the cylinders would be to arrange the cylinders of the rows in longitudinal planes and to use a symmetrical crankshaft, with Y equally-spaced throws.

What I claim as my invention and desire to secure by Letters Patent of the United States is:—

1. An air-cooled internal-combustion engine having a Y-throw crankshaft, and X rows of cylinders arranged radially in a circle and spaced angularly from one another, each row comprising Y cylinders arranged with their main axes in a longitudinal plane and associated, respectively, with the throws of the crankshaft, where X and Y are both greater than 2 and where Y is an odd number, characterized in that the crankshaft is an unsymmetrical one having its throws angularly spaced with respect to one another by angles which are
$$\frac{360°}{XY}$$
or any multiple thereof, provided that the value thereof is not
$$\frac{360°}{X}$$
or a multiple thereof.

2. An air-cooled internal-combustion engine having a 3-throw crankshaft, and X rows of cylinders (X being greater than 2) arranged radially in a circle and spaced angularly from one another, each row comprising 3 cylinders arranged with their main axes in a longitudinal plane and associated, respectively, with the throws of the crankshaft, characterized in that the crankshaft is an unsymmetrical one having its front and rear throws angularly spaced equally from the third throw by angles which are $$\frac{360°}{3X}$$

or any multiple thereof, provided that the value thereof is not $$\frac{360°}{X}$$

or a multiple thereof.

3. An air-cooled internal-combustion engine having a 3-throw crankshaft, and 9 rows of cylinders arranged radially in a circle and spaced angularly from one another, each row comprising 3 cylinders arranged with their main axes in a longitudinal plane and associated, respectively, with the throws of the crankshaft, the crankshaft being arranged so as to provide for equal intervals of firing of all the cylinders and having its throws angularly spaced with respect to one another by angles which are 13° 20' or any multiple thereof except 3 (13° 20') or any multiple thereof.

HERBERT LANGLEY TOWNS.